United States Patent
Wu et al.

(10) Patent No.: US 11,831,857 B1
(45) Date of Patent: Nov. 28, 2023

(54) STRUCTURED LIGHT SCANNING DEVICE AND METHOD THEREOF

(71) Applicant: QISDA CORPORATION, Taoyuan (TW)

(72) Inventors: Chuang-Wei Wu, Taoyuan (TW); Yen-Tsun Lin, Taichung (TW)

(73) Assignee: Qisda Corporation, Taoyuan (TW)

(*) Notice: Subject to any disclaimer, the term of this patent is extended or adjusted under 35 U.S.C. 154(b) by 8 days.

(21) Appl. No.: 17/830,293

(22) Filed: Jun. 1, 2022

(30) Foreign Application Priority Data

May 9, 2022 (CN) .......................... 202210503068.6

(51) Int. Cl.
*G06T 7/55* (2017.01)
*H04N 13/254* (2018.01)
*G06T 7/521* (2017.01)
*G06T 7/11* (2017.01)
*H04N 13/128* (2018.01)
*H04N 13/161* (2018.01)
*H04N 13/00* (2018.01)

(52) U.S. Cl.
CPC ............. *H04N 13/254* (2018.05); *G06T 7/11* (2017.01); *G06T 7/521* (2017.01); *G06T 7/55* (2017.01); *H04N 13/128* (2018.05); *H04N 13/161* (2018.05); *G06T 2207/20021* (2013.01); *H04N 2013/0081* (2013.01); *H04N 2013/0092* (2013.01)

(58) Field of Classification Search
CPC .. H04N 13/254; H04N 13/128; H04N 13/161; G06T 7/55; G06T 7/521; G06T 7/11
USPC .......................................................... 348/46
See application file for complete search history.

(56) References Cited

U.S. PATENT DOCUMENTS

2011/0279656 A1* 11/2011 Unsalan ............ G01B 11/2509
348/E13.074

\* cited by examiner

*Primary Examiner* — Nguyen T Truong

(57) ABSTRACT

A structured light scanning method includes a light projector projecting a group of structured light to an object, an image capturing device capturing a group of images generated by the object reflecting the group of structured light, an image processor obtaining a pixel luminosity distribution of an image in the group of images, the image processor determining a reflection state of the image from the pixel luminosity distribution, the image processor determining whether to include the image in generating a depth map according to the reflection state, and the image processor decoding at least one image from the group of images to generate the depth map.

20 Claims, 7 Drawing Sheets

STRUCTURED LIGHT SCANNING DEVICE AND METHOD THEREOF

BACKGROUND OF THE INVENTION

1. Field of the Invention

The present invention is related to a scanning device, and more particularly to a structured light scanning device and method.

2. Description of the Prior Art 3D scanning is the process of analyzing a real-world object or environment to collect data on its shape and possibly its appearance (e.g. color). The collected data can then be used to construct digital 3D models. Collected 3D data is useful for a wide variety of applications. These devices are used extensively by the entertainment industry in the production of movies and video games, including virtual reality. Other common applications of this technology include augmented reality, motion capture, gesture recognition, robotic mapping, industrial design, orthotics and prosthetics, reverse engineering and prototyping, quality control/inspection and medical applications.

A 3D scanner can be based on many different technologies. Particularly, structured light scanners are widely used to construct digital 3D models. Structured light scanning technique projects accurate patterns onto a target and then measures the displacement or distortion in order to calculate the shape, size or position of the object. In the simplest form, a line is projected onto a target and observed under a known angle from a camera. The distortions in the line can then be translated into height variations. This technique is often referred to as laser triangulation. Structured illumination is often used to obtain height information and especially for 3D inspection tasks.

However, when the structured light is projected onto a metal object, the reflection image may be saturated due to high reflectivity of the material and the 3D modeling result may be badly affected. For a structured light based 3D intraoral dental scanner, in order to overcome the above-mentioned problem, powder can be sprayed on the surface of the metal object to reduce the reflection and improve the quality of optical texture detection and modeling. However, spraying powder not only increases scanning labor and time, but also the factors such as material cost, powder thickness and patient cooperation are involved. Therefore, it is an urgent problem to be able to provide high quality modeling on metal crown without powder spraying. It is also a challenge to obtain high scanning and 3D modeling quality through the integration of software and hardware.

SUMMARY OF THE INVENTION

The embodiment provides a structured light scanning method. The method includes a light projector projecting a group of structured light to an object, an image capturing device capturing a group of images generated by the object reflecting the group of structured light, an image processor obtaining a pixel luminosity distribution of an image in the group of images, the image processor determining a reflection state of the image from the pixel luminosity distribution, the image processor determining whether to include the image in generating a depth map according to the reflection state, and the image processor decoding at least one image from the group of images to generate the depth map.

The embodiment provides another structured light scanning method. The method includes a light projector projecting a group of structured light to an object, an image capturing device capturing a group of images generated by the object reflecting the group of structured light, an image processor obtaining a pixel luminosity distribution of an image in the group of images, the image processor determining a reflection state of the image from a pixel luminosity distribution, the image processor adjusting at least one parameter of the light projector and at least one parameter of the image capturing device according to the reflection state, and the image processor decoding the group of images to generate the depth map.

The embodiment provides structured light scanning device including a light projector, an image capturing device and an image processor coupled to the light projector and the image capturing device. The light projector is for projecting a group of structured light to an object. The image capturing device is for capturing a group of images generated by the object reflecting the group of structured light. The image processor is for obtaining a pixel luminosity distribution of an image in the group of images, determining a reflection state of the image from the pixel luminosity distribution, determining whether to include the image in generating a depth map according to the reflection state, and decoding at least one image from the group of images to generate the depth map.

These and other objectives of the present invention will no doubt become obvious to those of ordinary skill in the art after reading the following detailed description of the preferred embodiment that is illustrated in the various figures and drawings.

DETAILED DESCRIPTION

The ordinal numbers such as "first", "second", etc. are used in the specification and claims to modify the elements in the claims. It does not mean that the required element has any previous ordinal number, and it does not represent the order of a required element and another required element or the order in the manufacturing method. The ordinal number is just used to distinguish the required element with a certain name and another required element with the same certain name.

Certain terms are used throughout the description and following claims to refer to particular elements. As one skilled in the art will understand, electronic equipment manufacturers may refer to an element by different names. This document does not intend to distinguish between elements that differ in name but not function. In the following description and in the claims, the terms "comprise", "include" and "have" are used in an open-ended fashion, and thus should be interpreted to mean "include, but not limited to".

Figure 1:
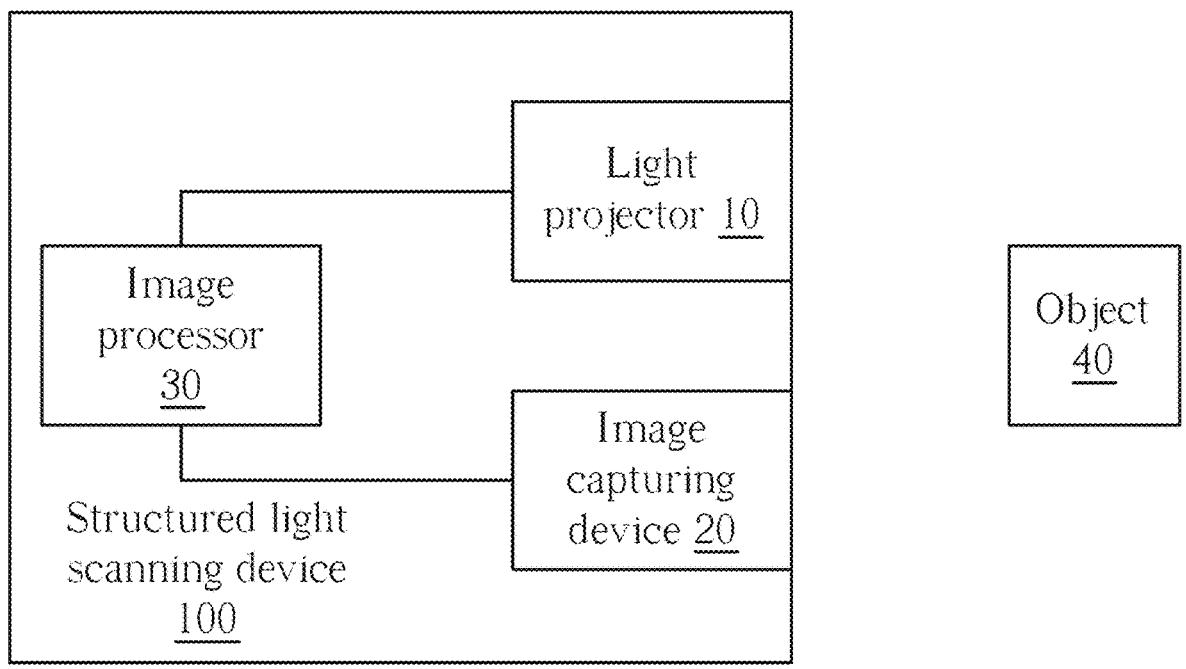
FIG. 1 illustrates a diagram of a structured light scanning device of an embodiment.

FIG. 1 illustrates a diagram of a structured light scanning device 100 of an embodiment. The structured light scanning device 100 includes a light projector 10 for projecting a group of structured light to the object 40, an image capturing device 20 for capturing a group of images generated by reflecting the structured light from the object 40, and an image processor 30 coupled to the light projector 10 and the image capturing device 20. The image processor 30 is for obtaining the pixel luminosity distribution of an image in the group of images, determining the reflection state of the image according to the pixel luminosity distribution, determining whether to include the image in generating a depth map according to the reflection state, and decoding at least one image from the group of images to generate the depth map. The light projector 10 may be a liquid crystal display (LCD) projector, a liquid crystal on silicon (LCOS) projector, or a digital light processing (DLP) projector. The image capturing device 20 can be any three-dimensional camera. The image processor 30 can be any form of image processing device, such as a central processing unit, a microprocessor, an arithmetic-logic unit or a programmable chip, or any other device that can process images.

Figure 2:
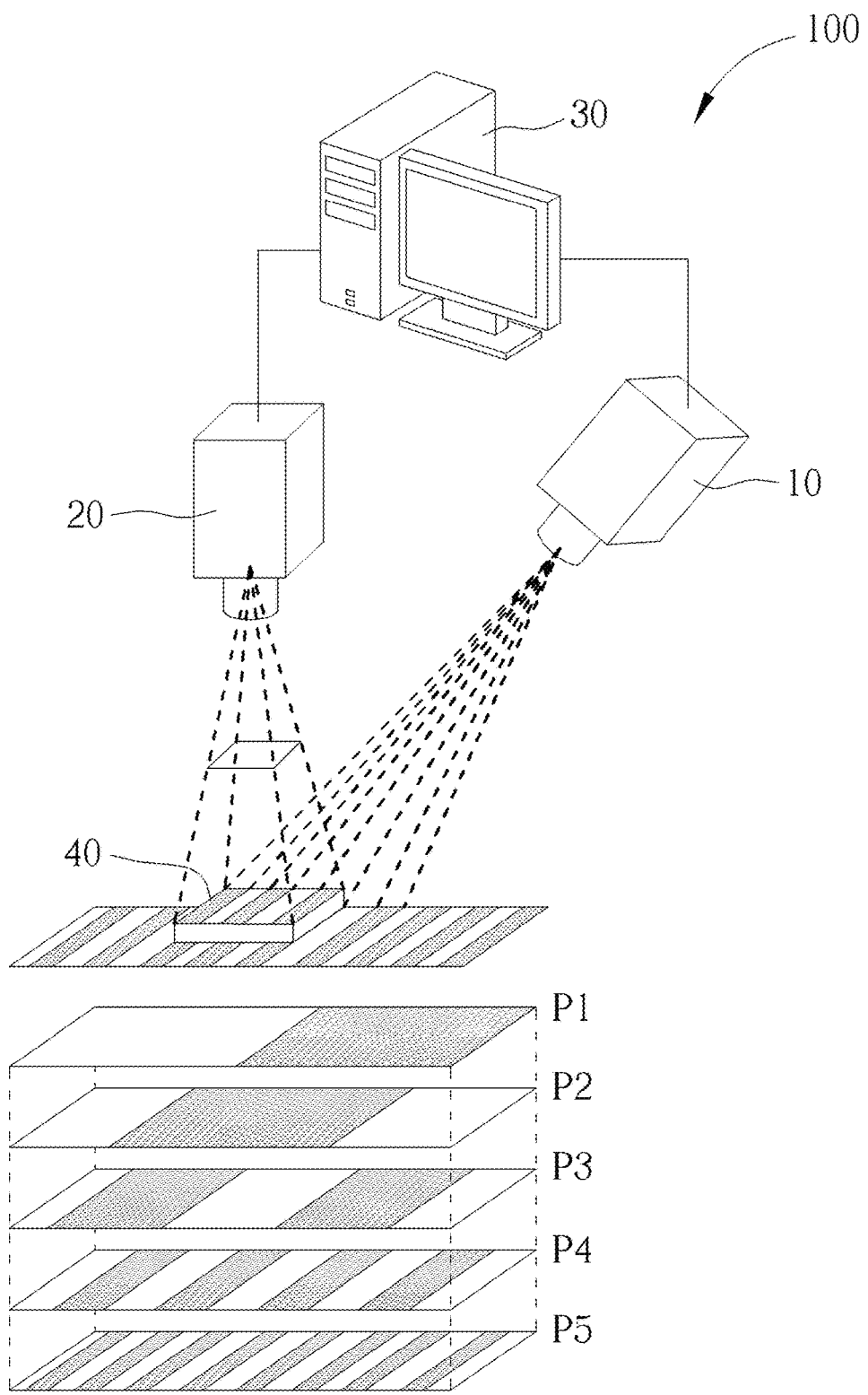
FIG. 2 illustrates a diagram of the structured light scanning device of FIG. 1 projecting light and capturing images.

FIG. 2 illustrates a diagram of the structured light scanning device 100 projecting light and capturing images. The light projector 10 can project a group of structured light P1-P5 with a predetermined pattern to the object 40. When the predetermined pattern is projected on the surface of the object 40 with different shapes, textures and/or depths, pattern deformation would occur, and the object 40 reflects the structured light. The images generated by the group of structured light P1-P5 are the deformed predetermined patterns. It includes pixel grayscale values of a plurality of pixels. The image capturing device 20 captures the image (i.e. the deformed predetermined pattern) generated by the reflection of the object 40 and sends it to the image processor 30. The image processor 30 can store the images and calculate the three-dimensional (3D) position information of the feature points of the object 40 based on the predetermined patterns of the structured light P1-P5 and the images reflected by the object 40. Then the image processor 30 can also calculate the 3D position information of the feature points on the surface of the object 40. The 3D position information can be directly used as vertex. Alternatively, it can only use the 3D position information falling within a predetermined depth range or a predetermined space range as vertices. Such vertices form a point cloud. It is used to build a depth map of the object 40. Furthermore, the image processor 30 may analyze each image and generate a pixel luminosity distribution map for each image. In the embodiment, for example, the structured light scanning device 100 may be a structured light based 3D intraoral dental scanner, and the object 40 may be a tooth. It should be noted that the above-mentioned group of structured light and corresponding images are not limited in number. It may include one or more sets of structured light and corresponding images, but the embodiment is not limited thereto.

In addition, the pattern of the group of structured light can be binary coded pattern, gray coded pattern, triangular trapezoidal phase coded pattern, continuous sinusoidal phase pattern or color coded pattern. The coding of the group of structured light can be time multiplexing coding, spatial neighborhood coding or direct coding.

Figure 3:
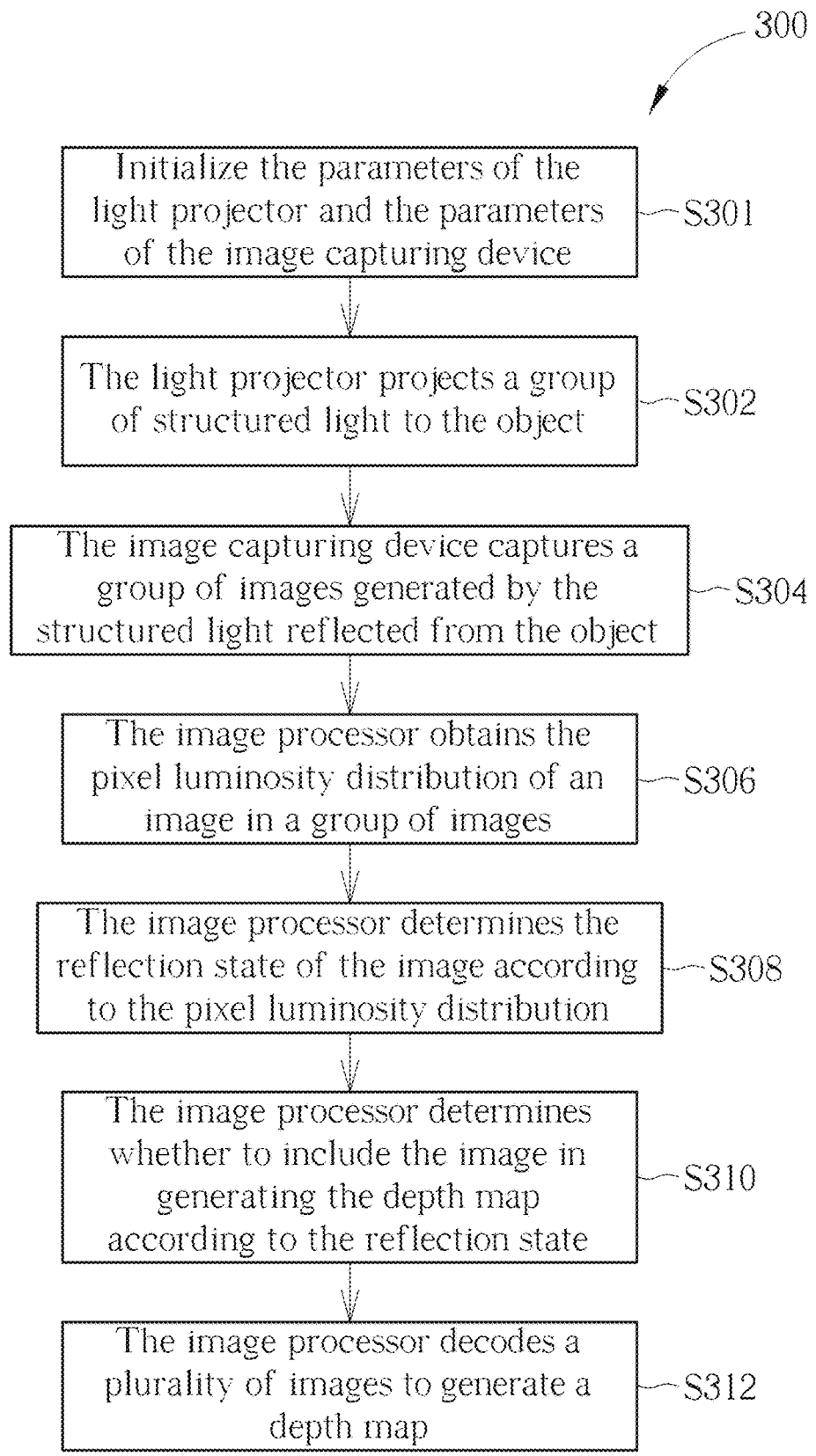
FIG. 3 is a flowchart of a method using the structured light scanning device in FIG. 1.

FIG. 3 is a flowchart of a method 300 using the structured light scanning device in FIG. 1. The method 300 includes the following steps:

S301: Initialize the parameters of the light projector 10 and the parameters of the image capturing device 20;
S302: The light projector 10 projects a group of structured light to the object 40;
S304: The image capturing device 20 captures a group of images generated by the structured light reflected from the object 40;
S306: The image processor 30 obtains the pixel luminosity distribution of an image in a group of images;
S308: The image processor 30 determines the reflection state of the image according to the pixel luminosity distribution;
S310: The image processor 30 determines whether to include the image in generating the depth map according to the reflection state; and
S312: The image processor 30 decodes at least one image from the group of images to generate a depth map.

When the structured light scanning device 100 is turned on, the user can initialize the parameters of the light projector 10 (e.g., projection luminosity and projection time) and the parameters of the image capturing device 20 (e.g., gain, aperture and sampling time). The light projector 10 projects structured light onto an object 40, such as a tooth. Then, the image capturing device 20 sequentially captures the images reflected by the object 40. The sampling interval between images may be, for example, 0.01 seconds, but the embodiment is not limited thereto.

Figure 4A:
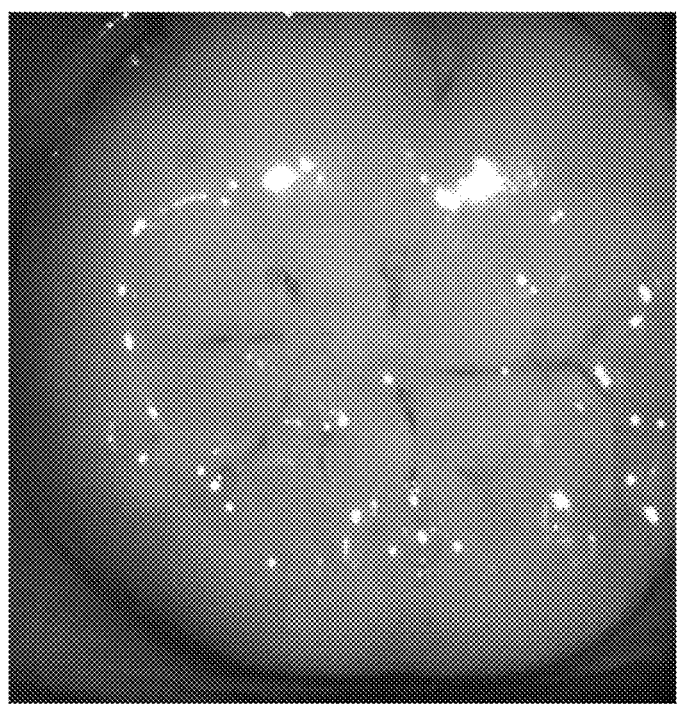
FIGS. 4A and 4B illustrate an image of a real tooth and its corresponding pixel luminosity histogram of the embodiment.
Figure 4B:
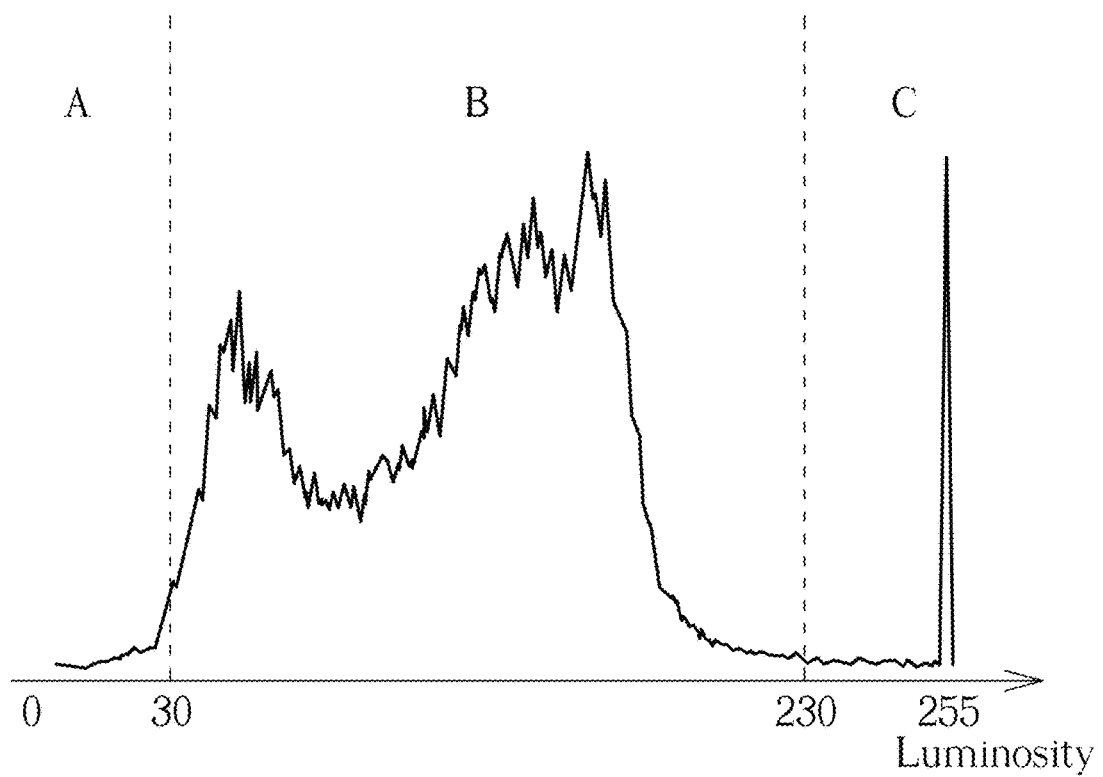

FIGS. 4A and 4B illustrate an image of a real tooth and its corresponding pixel luminosity histogram of the embodiment. The image processor 30 analyzes the image of the real tooth to generate a pixel luminosity distribution. The pixel luminosity values of an image captured by the image capturing device 20 may have a range between 0 and 255, where 0 represents the darkest pixel and 255 represents the brightest pixel. Next, the image processor 30 can determine the reflection state from the pixel luminosity distribution. The method of determining the reflection state from the pixel luminosity distribution is described as follows.

The pixel luminosity distribution of a highly reflective image is mostly concentrated at the highest and lowest region of the histogram, while the pixel luminosity distribution of a normal image is generally concentrated in the middle. The system can preset threshold values and determining conditions to determine the reflection state. If in the image the sum of the number of pixels with luminosity values lower than the first threshold and the number of pixels with luminosity values higher than the second threshold is less than the number of pixels with luminosity values between the first threshold and the second threshold, the image processor 30 can determine that the reflection state of the image is a normal reflection state. In an embodiment, the number of pixels with luminosity values in region A (0-30) plus the number of pixels with luminosity values in region C (231-255) is less than the number of pixels with luminosity values in region B (31-230), then the image processor 30 can determine that the image of the real tooth has normal reflection state. Thus, it can be included in generating the depth map. On the contrary, if the image is determined to have high reflection state, the image would not be included to decode and generate the depth map, and the parameters of the light projector 10 and the image capturing device 20 are adjusted. The details are described in the following paragraphs.

Figure 5A:
FIGS. 5A and 5B illustrate an image of a metal crown and its corresponding pixel luminosity histogram of the embodiment.
Figure 5B:
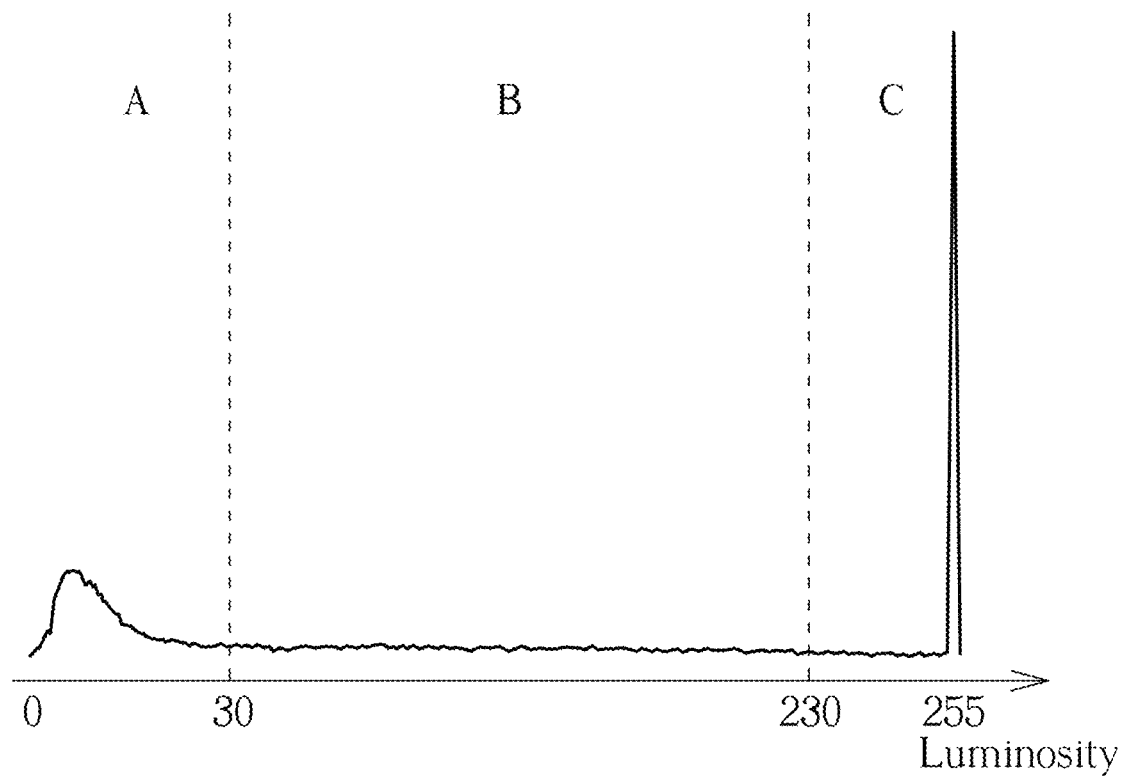

FIGS. 5A and 5B illustrate an image of a metal crown and its corresponding pixel luminosity histogram of the embodiment. If in the image the sum of the number of pixels with luminosity values lower than the first threshold and the number of pixels with luminosity values higher than the second threshold is greater than the number of pixels with luminosity values between the first threshold and the second threshold, the image processor 30 can determine that the image has high reflection state. In the embodiment, due to the material properties of the metal crown, the number of pixels with luminosity values in region A (0-30) plus the number of pixels with luminosity values in region C (231-255) is greater than the number of pixels with luminosity values in region B (31-230). In this case, the image processor 30 can determine that the image of the metal crown has high reflection state. The image would not be included to decode the depth map, and the parameters of the light projector 10 and the image capturing device 20 are adjusted to obtain the image with normal reflection state.

For example, the image processor 30 can reduce the projection luminosity and/or the projection time of the light projector 10. It can also reduce the gain and/or the aperture, and shorten the sampling time of image capturing device 20. As a result of adjusting these parameters the overall luminosity of the image captured in the next cycle can be reduced so as to obtain the image of the metal crown with normal reflection state. Furthermore, for images included for decoding, in order to avoid overexposure or structured light refraction resulting in some pixels having excessively high luminosity values (for example, pixel luminosity values exceeding 250) affecting the decoding result, the image processor 30 can mask those pixels with excessively high luminosity values before decoding. As the result, the subsequent decoding process can ignore those pixels to avoid image noise interfering with generating the depth map. However, the embodiment is not limited thereto, and other parameters and thresholds also fall within the scope of the present invention.

In addition, the image processor 30 can prioritize the various parameters of the image capturing device 20, and preferentially, it can first adjust the gain of the image capturing device 20. If the image of the metal crown with normal reflection state still cannot be obtained, it then can adjust the parameters of the light projector 10. Generally speaking, the image capturing speed of the image capturing device 20 is very fast, so hundreds of images can be captured every second. The speed of adjusting the luminosity of the structured light projected by the light projector 10 is relatively slow and unstable. Thus, it would be better to give priority to the parameters of the image capturing device 20 during the scanning process. Further, adjusting the luminosity of the structured light projected by the light projector 10 may increase power consumption. Taking the 3D intraoral dental scanner as an example, it would be more difficult to dissipate heat as the device tends to be small in size.

Also, on the 3D intraoral dental scanner, the gain parameter of the image capturing device 20 can be directly adjusted by the scanning software in real time during the scanning process, so the operation would not be interrupted or delayed. In contrast, adjusting the parameters of the light projector 10 is likely to delay the scanning process or stop the operation. Moreover, the risk of adjusting the gain parameter is lower than the risk of adjusting the capturing time. Prolonged capturing time or light projection time may lead to motion blur, causing inability to modeling and distortion to the depth map. In severe cases, splicing of the depth map may not be properly achieved.

Figure 6:
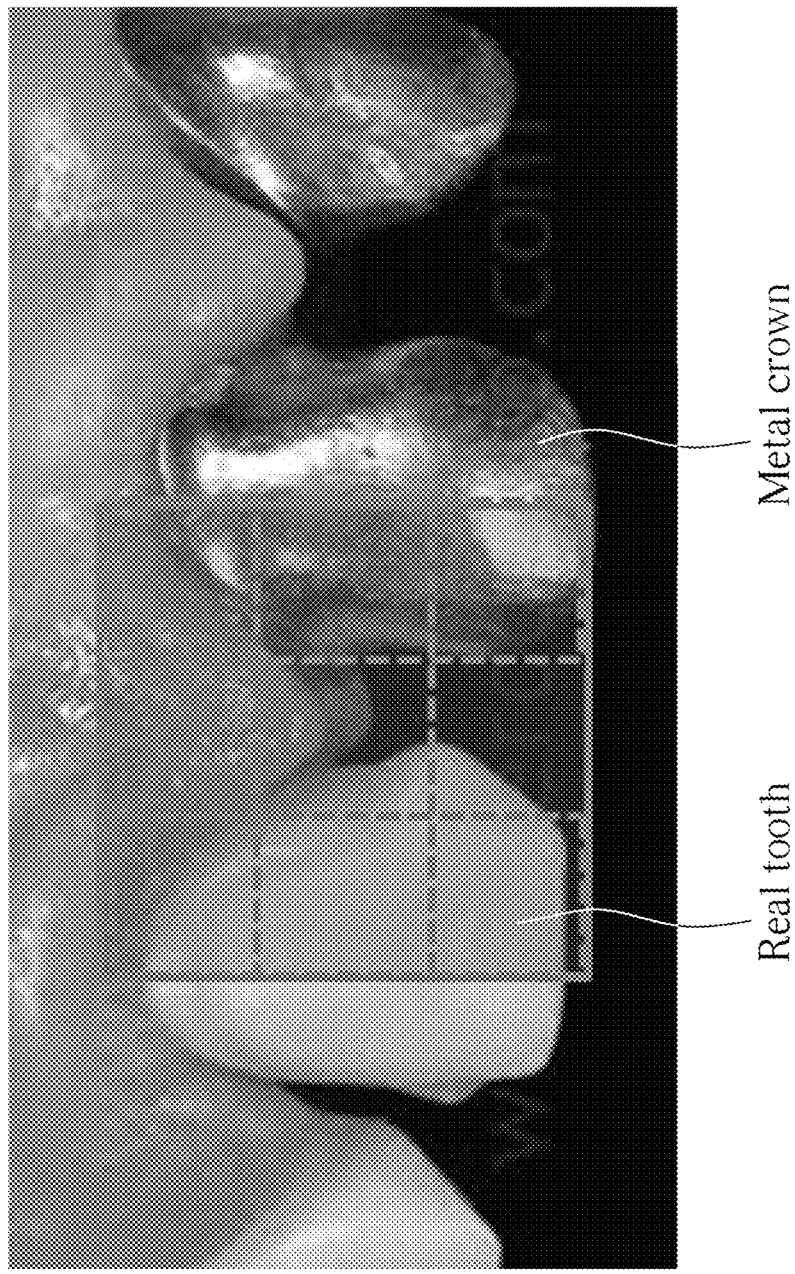
FIG. 6 illustrates an oral image with segmentation blocks of the embodiment.

FIG. 6 illustrates an oral image with segmentation blocks of the embodiment. As shown in FIG. 6, the image can include a real tooth and a metal crown, and the image captured by the image capturing device 20 can be divided into blocks and the pixel luminosity of each block can be calculated. The image processor 30 may divide the image into N blocks, such as nine blocks shown in the figure. Next, the image processor 30 can analyze the image and obtain the pixel luminosity distribution of each block and determine the reflection state of each block from the corresponding pixel luminosity distribution. Then, according to N reflection states corresponding to the N blocks, applying interpolation to adjust the parameters of the light projector 10 and the image capturing device 20 so as to obtain the image with normal reflection state. N is an integer greater than 1. The image processor 30 can analyze the image of each block to obtain the pixel luminosity distribution and determine the reflection state of the corresponding block from the pixel luminosity distribution in the same manner as described in previous paragraphs. The description is therefore not repeated herein. Also, other methods of calculating pixel luminosity by blocks also fall within the scope of the present invention, and the embodiment is not limited thereto.

Figure 7A:
FIGS. 7A and 7B illustrate images of projecting structured light with different resolutions projecting on the metal crown in FIG. 5A.
Figure 7B:

FIGS. 7A and 7B illustrate images of projecting structured light with different resolutions projecting on the metal crown. As shown in FIG. 7A, when high resolution structured light (thin stripes) is projected on the metal crown, the high reflective property of the metal crown with higher spatial frequencies may cause higher image noise. For example, in FIG. 7A, the interval between black and white stripes is blurred. This image noise is likely to interfere with decoding and 3D modeling. Even after adjusting the parameters of the light projector 10 and the image capturing device 20, the center and fringe positions of the stripes still cannot be correctly determined. In order to solve this problem, the image processor 30 may determine the limit of the structured light resolution to be included in generating the depth map. For example, the image processor 30 may not include the image with higher resolution structured light (as shown in FIG. 7A) for decoding, but it may only use the image with lower resolution structured light (thick stripes as shown in FIG. 7B) for decoding. By using this method, it can obtain more accurate stripes at center and fringe positions, balancing resolution and accuracy. Finally, the image processor 30 can decode the previously processed images to generate the depth map of the object 40, and can also splice together multiple depth maps to create a panoramic depth map to obtain a high quality 3D model.

In summary, the structured light scanning device and method of the embodiment of the present invention relies on the integration of image processing software and hardware without the need for applying the aforementioned powder spraying. It can determine in real-time the reflection state of the object and improve the image quality of 3D intraoral dental scanner, according to the reflection state, decoding quality and decision-making algorithm. As the result, the structured light scanning device and method presented in this disclosure can obtain high quality depth map and 3D model of high reflective metal crowns without changing the existing high-speed structured light projection process, thereby improving the success rate of 3D modeling and shortening the scan time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A structured light scanning method, comprising:
a light projector projecting a group of structured light to an object;
an image capturing device capturing a group of images generated by the object reflecting the group of structured light;
an image processor obtaining a pixel luminosity distribution of an image in the group of images;
the image processor determining a reflection state of the image from the pixel luminosity distribution;
the image processor determining whether to include the image in generating a depth map according to the reflection state; and
the image processor decoding at least one image from the group of images to generate the depth map.

2. The method of claim 1, further comprising the image processor splicing a plurality of depth maps.

3. The method of claim 1, further comprising:
the image processor adjusting at least one parameter of the light projector and at least one parameter of the image capturing device according to the reflection state; and
initializing the at least one parameter of the light projector and the at least one parameter of the image capturing device.

4. The method of claim 3, wherein:
the at least one parameter of the light projector includes a projection luminosity and a projection time; and
the at least one parameter of the image capturing device includes a gain, an aperture and a capturing time.

5. The method of claim 1, wherein the image processor determining the reflection state of the image from the pixel luminosity distribution, comprises:
if in the image a sum of a number of pixels with luminosity values below a first threshold and a number of pixels with luminosity values above a second threshold is greater than a number of pixels with luminosity values between the first threshold and the second threshold, the reflection state of the image is determined to be high reflection state.

6. The method of claim 5, wherein the image processor determining whether to use the image to generate the depth map according to the reflection state, comprises:
if the reflection state of the image is high reflection state, the image processor does not use the image to generate the depth map.

7. The method of claim 1, further comprising the image processor removing a pixel in the image if a luminosity of the pixel is greater than a threshold.

8. The method of claim 1, further comprising:
the image processor dividing the image into N blocks;
the image processor obtaining a pixel luminosity distribution of each block of the N blocks;
the image processor determining a reflection state of a corresponding block from the pixel luminosity distribution; and
the image processor adjusting at least one parameter of the light projector and at least one parameter of the image capturing device according to N reflection states corresponding to the N blocks;
wherein N>1.

9. The method of claim 1, wherein:
a pattern of the group of structured light is binary coded pattern, gray coded pattern, triangular trapezoidal phase coded pattern, continuous sinusoidal phase pattern or color coded pattern; and
a coding of the group of structured light is time multiplexing coding, spatial neighborhood coding or direct coding.

10. A structured light scanning method, comprising:
a light projector projecting a group of structured light to an object;
an image capturing device capturing a group of images generated by the object reflecting the group of structured light;
an image processor obtaining a pixel luminosity distribution of an image in the group of images;
the image processor determining a reflection state of the image from a pixel luminosity distribution;
the image processor adjusting at least one parameter of the light projector and at least one parameter of the image capturing device according to the reflection state; and
the image processor decoding at least one image from the group of images to generate the depth map.

11. A structured light scanning device, comprising:
a light projector configured to project a group of structured light to an object;
an image capturing device configured to capture a group of images generated by the object reflecting the group of structured light;
an image processor, coupled to the light projector and the image capturing device, and configured to:
obtain a pixel luminosity distribution of an image in the group of images;
determine a reflection state of the image from the pixel luminosity distribution;
determine whether to include the image in generating a depth map according to the reflection state; and
decode at least one image from the group of images to generate the depth map.

12. The structured light scanning device of claim 11, wherein the image processor is further configured to splice a plurality of depth maps.

13. The structured light scanning device of claim 11, wherein the image processor is further configured to adjust at least one parameter of the light projector and at least one parameter of the image capturing device according to the reflection state.

14. The structured light scanning device of claim 13, wherein:
the at least one parameter of the light projector includes a projection luminosity and a projection time; and
the at least one parameter of the image capturing device includes a gain, an aperture and a capturing time.

15. The structured light scanning device of claim 11, wherein:
if in the image a sum of a number of pixels with luminosity values below a first threshold and a number of pixels with luminosity values above a second threshold is greater than a number of pixels with luminosity values between the first threshold and the second threshold, the reflection state of the image is determined to be high reflection state.

16. The structured light scanning device of claim 15, wherein:

if the reflection state of the image is high reflection state, the image processor does not use the image to generate the depth map.

17. The structured light scanning device of claim 11, wherein:

the image processor removes a pixel in the image if a luminosity of the pixel is greater than a threshold.

18. The structured light scanning device of claim 11, wherein the image processor is further configured to:

divide the image into N blocks;

obtain a pixel luminosity distribution of each block of the N blocks;

determine a reflection state of a corresponding block from the pixel luminosity distribution; and adjust at least one parameter of the light projector and at least one parameter of the image capturing device according to the N reflection states corresponding to the N blocks;

wherein N>1.

19. The structured light scanning device of claim 11, wherein:

a pattern of the group of structured light is binary coded pattern, gray coded pattern, triangular trapezoidal phase coded pattern, continuous sinusoidal phase pattern or color coded pattern; and a coding of the group of structured light is time multiplexing coding, spatial neighborhood coding or direct coding.

20. The structured light scanning device of claim 11, wherein the light projector is a liquid crystal display (LCD) projector, a liquid crystal on silicon (LCOS) projector, or a digital light processing (DLP) projector.

* * * * *